United States Patent
Winkelvos et al.

(10) Patent No.: US 10,791,098 B2
(45) Date of Patent: Sep. 29, 2020

(54) METHOD FOR PROVIDING AN AUTHENTICATED CONNECTION BETWEEN AT LEAST TWO COMMUNICATION PARTNERS

(71) Applicant: VOLKSWAGEN AG, Wolfsburg (DE)

(72) Inventors: Timo Winkelvos, Sickte (DE); Alexander Tschache, Wolfsburg (DE); Martin Wuschke, Meine (DE)

(73) Assignee: VOLKSWAGEN AG, Wolfsburg (DE)

(*) Notice: Subject to any disclaimer, the term of this patent is extended or adjusted under 35 U.S.C. 154(b) by 115 days.

(21) Appl. No.: 15/659,662

(22) Filed: Jul. 26, 2017

(65) Prior Publication Data
US 2018/0034785 A1  Feb. 1, 2018

(30) Foreign Application Priority Data
Jul. 26, 2016 (DE) .................. 10 2016 213 685

(51) Int. Cl.
*H04L 29/06* (2006.01)
*H04L 9/32* (2006.01)
(Continued)

(52) U.S. Cl.
CPC ........ *H04L 63/0435* (2013.01); *H04L 9/0841* (2013.01); *H04L 9/3226* (2013.01);
(Continued)

(58) Field of Classification Search
CPC . H04L 63/0435; H04L 63/08; H04L 63/0869; H04L 63/061; H04L 63/0823;
(Continued)

(56) References Cited

U.S. PATENT DOCUMENTS

| 2004/0083368 A1* | 4/2004 | Gehrmann | H04L 9/0841 713/171 |
| 2005/0273609 A1* | 12/2005 | Eronen | H04L 63/0428 713/171 |

(Continued)

FOREIGN PATENT DOCUMENTS

| CN | 101534505 A | 9/2009 |
| CN | 102130707 A | 7/2011 |

(Continued)

OTHER PUBLICATIONS

M. Lepinski, S. Kent "Additional Diffie-Hellman groups for use with IETF standards", RFC 5114, Jan. 2008, 24 pages (Year: 2008).*

(Continued)

*Primary Examiner* — Catherine Thiaw
(74) *Attorney, Agent, or Firm* — Barnes & Thornburg LLP

(57) ABSTRACT

A method for providing an authenticated connection between at least two communication partners and to a communication system. The method includes providing a shared secret key for the at least two communication partners; setting up an anonymous signal-conducting connection between the at least two communication partners, wherein all messages of the connection between the at least two communication partners are encrypted using the shared secret key; and authenticating the connection between the at least two communication partners by a user. The method provides a secure and convenient authentication of a connection between two communication partners, wherein the authentication is effected at the application level.

13 Claims, 2 Drawing Sheets

(51) Int. Cl.
*H04L 9/08* (2006.01)
*H04L 9/30* (2006.01)

(52) U.S. Cl.
CPC .......... *H04L 63/08* (2013.01); *H04L 63/0869* (2013.01); *H04L 9/3013* (2013.01); *H04L 9/3263* (2013.01); *H04L 63/061* (2013.01); *H04L 63/0823* (2013.01); *H04L 2209/84* (2013.01)

(58) Field of Classification Search
CPC ... H04L 9/0841; H04L 9/3226; H04L 9/3013; H04L 9/3263; H04L 2209/84
See application file for complete search history.

(56) References Cited

U.S. PATENT DOCUMENTS

| | | | |
|---|---|---|---|
| 2006/0015722 | A1 | 1/2006 | Rowan et al. |
| 2009/0227282 | A1 | 9/2009 | Miyabayashi et al. |
| 2010/0275024 | A1 | 10/2010 | Abdulhayoglu |
| 2011/0177780 | A1 | 7/2011 | Sato et al. |
| 2011/0202427 | A1* | 8/2011 | Garcia Jurado Suarez ................ G06F 21/42 705/26.35 |
| 2012/0087493 | A1* | 4/2012 | Chidambaram ...... H04L 9/0841 380/44 |
| 2012/0093311 | A1* | 4/2012 | Nierzwick ............. G16H 20/17 380/255 |
| 2012/0266221 | A1* | 10/2012 | Castelluccia ......... H04L 9/3271 726/6 |
| 2014/0079217 | A1* | 3/2014 | Bai .................... H04L 63/0869 380/270 |
| 2014/0141750 | A1* | 5/2014 | Lazaridis ............ H04L 63/0492 455/411 |
| 2015/0326398 | A1* | 11/2015 | Modarresi ............... H04L 63/08 713/181 |
| 2017/0019935 | A1* | 1/2017 | Palin ..................... H04L 63/062 |

FOREIGN PATENT DOCUMENTS

| | | |
|---|---|---|
| CN | 104648321 A | 5/2015 |
| DE | 102005023544 A1 | 12/2006 |
| DE | 102012008834 A1 | 11/2012 |
| DE | 102013010250 A1 | 12/2014 |
| DE | 102014118555 A1 | 1/2016 |
| JP | 2001211149 A | 8/2001 |
| KR | 20090024264 A | 3/2009 |
| WO | 2014086654 A1 | 6/2014 |

OTHER PUBLICATIONS

Markus G. Kuhn "Optical Time-Domain Eavesdropping Risks of CRT Displays" , Proceedings of the 2002 IEEE Symposium on Security and Privacy (S&P02), 2002 IEEE , 16 pages (Year: 2002).*
Alex Olwal, Steven Feiner, Susanna Heyman "Rubbing and Tapping for Precise and Rapid Selection on Touch-Screen Displays", CHI 2008, Apr. 5-10, 2008, Florence, Italy, pp. 295-304 (Year: 2008).*
Message Access Profile; Revision V10r00; Jun. 4, 2009; downloaded from https://www.bluetooth.com/ko-kr/specifications/profiles-overview/legacy-profiles.
Office Action for Korean Patent Application No. 10-2017-0094099; dated Nov. 15, 2018.
Search Report for European Patent Application No. 17180653.2; dated Nov. 30, 2017.
Office Action for Chinese Patent Application No. 201710617637.9; dated Mar. 30, 2020.

* cited by examiner

METHOD FOR PROVIDING AN AUTHENTICATED CONNECTION BETWEEN AT LEAST TWO COMMUNICATION PARTNERS

PRIORITY CLAIM

This patent application claims priority to German Patent Application No. 10 2016 213 685.2, filed 26 Jul. 2016, the disclosure of which is incorporated herein by reference in its entirety.

SUMMARY

Illustrative embodiments relate to a method for providing an authenticated connection between at least two communication partners and to a communication system.

BRIEF DESCRIPTION OF THE DRAWINGS

Disclosed embodiments will be explained with reference to the associated drawings, in which.

DETAILED DESCRIPTION

Figure 1:
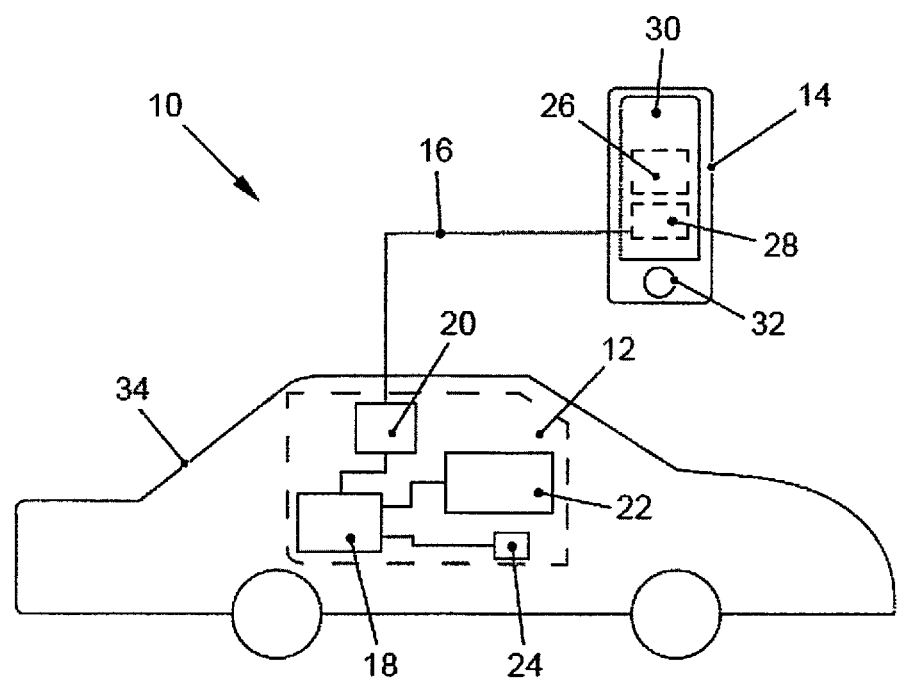
FIG. 1 shows an exemplary embodiment of the communication system in a schematic illustration.

Modern vehicles have infotainment systems which can be coupled to smartphones. By virtue of the coupling, an infotainment system can access media contents, for example, which are stored on the coupled smartphone, to reproduce them in the vehicle.

Moreover, a signal-conducting connection between the vehicle-internal infotainment system and the smartphone can be used to carry out a user identification or to provide application-related user data for the infotainment system.

Since personal data and application-related access data are usually also communicated between the infotainment system and the smartphone, the signal-conducting connection should be equipped with suitable protection.

The document DE 10 2005 023 544 A1 proposes for this purpose a communication system comprising a vehicle operating unit, a vehicle output unit, an interface computer and a mobile terminal, wherein the interface computer has access protection so that the mobile terminal can only access authorized vehicle functions.

The document DE 10 2012 008 834 A1 additionally discloses a method for connecting terminals to a device inherent to the vehicle, wherein coupling information is generated for connections between a terminal and a first pairing server, the coupling information being transmitted to a second pairing server to carry out a check of the authorization of the terminal.

Furthermore, the document DE 10 2014 118 555 A1 proposes a method for connecting a wireless terminal to a vehicle, wherein, after establishing a connection and identifying the wireless terminal, the method firstly determines whether the wireless terminal is authenticated and thus suitable for a connection to an infotainment system before a data exchange takes place.

In the known solutions, the authentication is always effected at the communication channel level. By way of example, the authentication of a BLUETOOTH® connection takes place, which can be used for all applications after successful authentication.

There is the problem, however, that it is not always the intention for all applications to have access to an authenticated connection. However, the known solutions are not suitable for authentication at the application level.

Disclosed embodiments enable a secure and convenient authentication of a connection between two communication partners, wherein the authentication can also be effected at the application level.

In the disclosed method for providing an authenticated connection between at least two communication partners, a shared secret key for the at least two communication partners is provided before an anonymous signal-conducting connection is set up between the at least two communication partners. All messages of the connection between the at least two communication partners are encrypted using the shared secret key. The connection between the at least two communication partners is authenticated by a user in addition to the encryption of the messages using the shared secret key.

The disclosed method provides a symmetrical or hybrid crypto-system in which the at least two communication partners use the same key for encryption and a preceding key exchange thus need not take place is combined with a pairing method in which the user additionally authenticates the connection between the at least two communication partners. The additional authentication, which is to be performed by the user, makes it possible to effectively avoid a man-in-the-middle attack (MITM attack). The security of the connection between the at least two communication partners is thus increased. Moreover, the necessity of user action allows the implementation of the authentication at the application level.

In the method, a first communication partner of the at least two communication partners can be embodied as a vehicle-internal device. The vehicle-internal device is embodied as an infotainment system of the vehicle. The first communication partner of the at least two communication partners may act as a server. Alternatively or additionally, in the method, a second communication partner of the at least two communication partners can be embodied as a mobile terminal. The mobile terminal is embodied as a smartphone. The second communication partner of the at least two communication partners may act as a client.

The anonymous signal-conducting connection between the at least two communication partners can be based on a transport layer security protocol. As a result of the hybrid encryption of the transport layer security protocol, security is increased further without the necessity of a preceding key exchange. The transport layer security protocol makes it possible to implement higher protocols on the basis of the transport layer security protocol protocol. The transport layer security protocol is thus independent of applications and of the system used.

Providing a shared secret key for the at least two communication partners can comprise carrying out a key exchange protocol for generating the shared secret key. The key exchange protocol may be an asymmetrical key exchange protocol, by means of which the shared secret key generated can be securely transmitted even via an intercepted communication channel. It is thus not necessary that the shared secret key must be communicated via a secure communication channel. Connection set-up is thus simplified and accelerated.

The key exchange protocol can comprise a Diffie-Hellman key exchange protocol. The Diffie-Hellman key exchange protocol used is based on elliptic curves (Elliptic Curve Diffie-Hellman (ECDH)). By means of the Diffie-Hellman key exchange protocol, the at least two communication partners can generate a shared secret key via a public and non-protected communication channel. In the case of the Diffie-Hellman key exchange protocol, however, there is the risk of an attacker intruding between the at least two communication partners and thus being able to alter messages. Since, in the disclosed method, a subsequent authentication of the connection is effected by the user, this risk is eliminated, with the result that the use of the Diffie-Hellman key exchange protocol for generating a shared secret key is suitable in the disclosed method.

Authenticating the connection between the at least two communication partners by the user can comprise calculating an integrity check value on the basis of the shared secret key by a first communication partner of the at least two communication partners, and/or calculating an integrity check value on the basis of the shared secret key by a second communication partner of the at least two communication partners. The calculation of an integrity check value makes it possible to check whether a man-in-the-middle attack has taken place. The integrity check value makes it possible to ensure that no undesired modification that could not be prevented has taken place. For this purpose, authenticating the connection between the at least two communication partners by the user may comprise reproducing, by the first communication partner, the integrity check value calculated by the first communication partner, and/or reproducing, by the second communication partner, the integrity check value calculated by the second communication partner. Reproducing the integrity check value calculated by the first communication partner can be effected, for example, by an optical reproduction of the integrity check value by means of a display unit of the first communication partner and/or by an acoustic reproduction of the integrity check value by means of a sound reproduction device of the first communication partner. Reproducing the integrity check value calculated by the second communication partner can be effected, for example, by an optical reproduction of the integrity check value by means of a display unit of the second communication partner and/or by an acoustic reproduction of the integrity check value by means of a sound reproduction device of the second communication partner.

Authenticating the connection between the at least two communication partners by the user can comprise comparing, by the user, the integrity check value reproduced by the first communication partner with the integrity check value reproduced by the second communication partner, and/or confirming, by the user, the equality of the integrity check value reproduced by the first communication partner and the integrity check value reproduced by the second communication partner. Confirming, by the user, the equality of the integrity check value reproduced by the first communication partner and the integrity check value reproduced by the second communication partner concludes the integrity check. If the integrity check values reproduced by the first communication partner and the second communication partner correspond, then the situation that an unnoticed man-in-the-middle attack has taken place can be ruled out. Authenticating the connection between the at least two communication partners can thus be effected by the user by the confirmation of the equality of the integrity check value reproduced by the first communication partner and the integrity check value reproduced by the second communication partner. In the case of a man-in-the-middle attack having been carried out, the integrity check value reproduced by the first communication partner would deviate from the integrity check value reproduced by the second communication partner. In this case, by means of a corresponding input, the user can notify the first communication partner and/or the second communication partner that correspondence is not present. The authentication would thus have failed since it must be assumed that a man-in-the-middle attack has taken place.

Confirming, by the user, the equality of the integrity check value reproduced by the first communication partner and the integrity check value reproduced by the second communication partner can comprise actuating an actuation device of the first communication partner by the user, and/or actuating an actuation device of the second communication partner by the user. The actuation device of the first communication partner and/or the actuation device of the second communication partner may comprise in each case one or more pressure-sensitive input elements, such as, for example, pushbuttons or keys, and/or a touchscreen. Alternatively or additionally, the actuation device of the first communication partner and/or the actuation device of the second communication partner comprise(s) in each case a sound recording device and an evaluation unit which is connected to the sound recording device and which is designed to evaluate voice inputs of the user.

The integrity check value calculated by the first communication partner and/or the second communication partner can be a checksum over the shared secret key or a checksum over a value derived from the shared secret key. The first communication partner and/or the second communication partner may calculate the integrity check value in each case by means of a cryptological hash function. The value determined therefrom does not permit the shared secret key to be inferred and is thus suitable for the disclosed method.

The disclosed communication system comprises at least two communication partners, wherein the at least two communication partners are configured to set up an anonymous signal-conducting connection to one another. In this case, all messages of the connection between the at least two communication partners are encrypted using a shared secret key. The at least two communication partners are additionally configured to the effect that a user can authenticate the connection between the at least two communication partners.

The disclosed communication system provides a symmetrical or hybrid crypto-system in which the at least two communication partners use the same key for encryption and a preceding key exchange thus need not take place is combined with a pairing method in which the user additionally authenticates the connection between the at least two communication partners. The additional authentication, which is to be performed by the user, makes it possible to effectively avoid a man-in-the-middle attack. The security of the connection between the at least two communication partners is thus increased. Moreover, the necessity of user action allows the implementation of the authentication at the application level.

A first communication partner of the at least two communication partners of the communication system can be embodied as a vehicle-internal device. The vehicle-internal device is embodied as an infotainment system of the vehicle. The first communication partner of the at least two communication partners may act as a server. Alternatively or additionally, a second communication partner of the at least two communication partners of the communication system is embodied as a mobile terminal. The mobile terminal is embodied as a smartphone. The second communication partner of the at least two communication partners may act as a client.

In the communication system, the anonymous signal-conducting connection between the at least two communication partners can be based on a transport layer security protocol. As a result of the hybrid encryption of the transport layer security protocol, security is increased further without the necessity of a preceding key exchange. The transport layer security protocol makes it possible to implement higher protocols on the basis of the transport layer security protocol protocol. The transport layer security protocol is thus independent of applications and of the system used.

The at least two communication partners can be configured to implement a key exchange protocol, in particular, a Diffie-Hellman key exchange protocol, for generating the shared secret key. The at least two communication partners are configured to implement a Diffie-Hellman key exchange protocol based on elliptic curves (Elliptic Curve Diffie-Hellman (ECDH)). By means of the Diffie-Hellman key exchange protocol, the at least two communication partners can generate a shared secret key via a public and non-protected communication channel. In the case of the Diffie-Hellman key exchange protocol, however, there is the risk of an attacker intruding between the at least two communication partners and thus being able to alter messages. Since, in the disclosed communication system, a subsequent authentication of the connection can be effected by the user, this risk is eliminated, with the result that the use of the Diffie-Hellman key exchange protocol for generating a shared secret key is suitable in the disclosed communication system.

The at least two communication partners can be configured in each case to calculate an integrity check value on the basis of the shared secret key and to reproduce it for the user by means of a display device, wherein the at least two communication partners may provide for the user in each case an actuation device for confirming the equality of the integrity check values reproduced by the at least two communication partners. The calculation of an integrity check value makes it possible to check whether a man-in-the-middle attack has taken place. The integrity check value makes it possible to ensure that no undesired modification that could not be prevented has taken place. The display device can be configured to reproduce the integrity check value optically and/or acoustically.

The communication system can additionally be configured to perform the method for providing an authenticated connection between at least two communication partners according to at least one of the embodiments described above. The same benefits and modifications as described above are applicable.

Further configurations are evident from the rest of the features mentioned herein.

The various disclosed embodiments mentioned in this application, unless explained otherwise in an individual case, can be combined with one another.

FIG. 1 shows a communication system 10 comprising two communication partners 12, 14. The first communication partner 12 is embodied as a vehicle-internal device of the vehicle 34, wherein the vehicle-internal device is an infotainment system. The second communication partner 14 is embodied as a mobile terminal, wherein the mobile terminal is embodied as a smartphone.

The first communication partner 12 comprises a computing unit 18, a communication module 20, a display device 22 and an actuation device 24. The communication module 20, the display device 22 and the actuation device 24 are connected to the computing unit 18 in a signal-conducting manner. The communication module 20 is configured to communicate with other communication partners wirelessly, for example, by BLUETOOTH®. The display device 22 is embodied as a display and integrated into the dashboard of the vehicle 34. The actuation device 24 comprises a plurality of pressure-sensitive input elements and is integrated into the center console of the vehicle 34.

The second communication partner 14 likewise comprises a computing unit 26, a communication module 28, a display device 30 and an actuation device 32. The communication module 28, the display device 30 and the actuation device 32 are connected to the computing unit 26 in a signal-conducting manner. The communication module 28 is configured to communicate with other communication partners wirelessly, for example, by BLUETOOTH®. The display device 30 is embodied as a touchscreen. The actuation device 32 is embodied as a pushbutton.

The two communication partners 12, 14 are configured to set up an anonymous signal-conducting connection 16 to one another via the respective communication modules 20, 28, wherein all messages of the connection 16 between the two communication partners 12, 14 are encrypted using a shared secret key. By virtue of the fact that the two communication partners 12, 14 are configured to implement a Diffie-Hellman key exchange protocol for generating the shared secret key, the key generation can be effected via a public and non-protected communication channel. The anonymous signal-conducting connection 16 between the two communication partners 12, 14 is based on a transport layer security protocol.

The two communication partners 12, 14 are configured to the effect that a user can authenticate the connection 16 between the two communication partners 12, 14. For this purpose, the first communication partner 12 and the second communication partner 14 calculate in each case an integrity check value on the basis of the shared secret key and display the calculated integrity check value to the user by means of the respective display device 22, 30. Via the respective actuation devices 24, 32, the user can then confirm the equality of the integrity check values displayed by the two communication partners 12, 14.

Authenticating the connection 16 between the two communication partners 12, 14 is effected by the user by the confirmation of the equality of the integrity check value displayed by the first communication partner 12 and the integrity check value reproduced by the second communication partner 14.

The communication system 10 shown is configured to perform the method for providing an authenticated connection 16 between at least two communication partners 12, 14.

Figure 2:
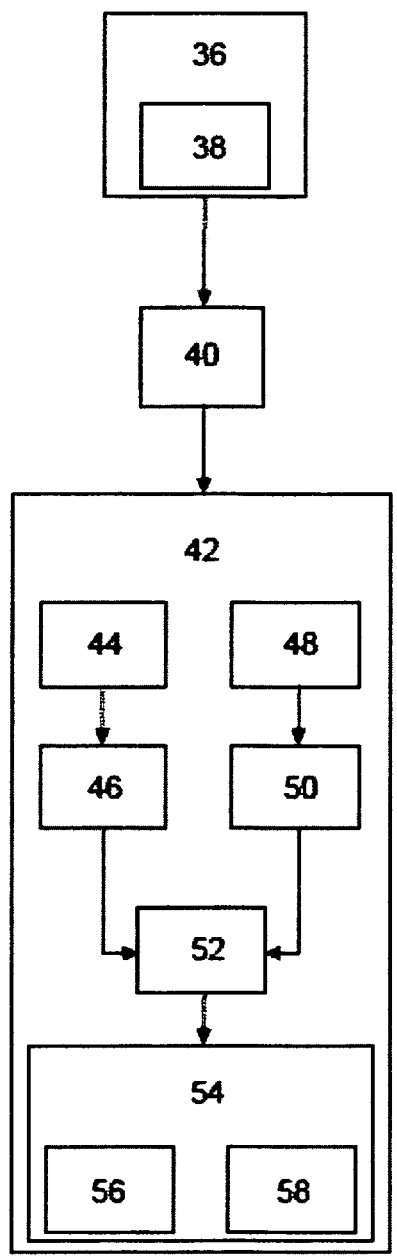
FIG. 2 shows an exemplary embodiment of the method in a schematic flow diagram.

FIG. 2 shows the disclosed method for providing an authenticated connection 16 between two communication partners 12, 14, which begins with the following operation:
  36) providing a shared secret key for the two communication partners 12, 14.

In this case, the first communication partner 12 is embodied as a vehicle-internal infotainment system and the second communication partner 14 is embodied as a smartphone.

Providing a shared secret key for the two communication partners 12, 14 comprises the following operation:
  38) carrying out a key exchange protocol for generating the shared secret key.

The key exchange protocol carried out is a Diffie-Hellman key exchange protocol. After a shared secret key has been provided for the two communication partners 12, 14, the following operation can be performed:
  40) setting up an anonymous signal-conducting connection 16 between the two communication partners 12, 14, wherein all messages of the connection 16 between the two communication partners 12, 14 are encrypted using the shared secret key.

The set-up anonymous signal-conducting connection 16 between the two communication partners 12, 14 is based on a transport layer security protocol. After the anonymous signal-conducting connection 16 between the two communication partners 12, 14 has been set up, the following operation is performed:

42) authenticating the connection 16 between the two communication partners 12, 14 by a user.

Authenticating the connection 16 between the two communication partners 12, 14 by the user comprises the following operations:

44) calculating an integrity check value on the basis of the shared secret key by a first communication partner 12 of the two communication partners 12, 14; and 46) reproducing, by the first communication partner 12, the integrity check value calculated by the first communication partner 12.

Moreover, authenticating the connection 16 between the two communication partners 12, 14 by the user comprises the following operations:

48) calculating an integrity check value on the basis of the shared secret key by a second communication partner 14 of the two communication partners 12, 14; and 50) reproducing, by the second communication partner 14, the integrity check value calculated by the second communication partner 14.

The integrity check value calculated by the first communication partner 12 and the second communication partner 14 is a checksum over the shared secret key. After the calculated integrity check value has in each case been reproduced for the user by the first communication partner 12 and the second communication partner 14, the following operation can be performed:

52) comparing, by the user, the integrity check value reproduced by the first communication partner 12 with the integrity check value reproduced by the second communication partner 14.

After the equality of the integrity check value reproduced by the first communication partner 12 with the integrity check value reproduced by the second communication partner 14 has been ascertained by the user, the following operation can be performed:

54) confirming, by the user, the equality of the integrity check value reproduced by the first communication partner 12 and the integrity check value reproduced by the second communication partner 14.

Confirming, by the user, the equality of the integrity check value reproduced by the first communication partner 12 and the integrity check value reproduced by the second communication partner 14 comprises the following operations:

56) actuating an actuation device 24 of the first communication partner 12 by the user; and 58) actuating an actuation device 32 of the second communication partner 14 by the user.

Authenticating the connection 16 between the two communication partners 12, 14 is effected by the user by the confirmation of the equality of the integrity check value reproduced by the first communication partner 12 and the integrity check value reproduced by the second communication partner 14.

The disclosed embodiments enable a secure and convenient authentication of a connection between two communication partners, without having to resort to a public key infrastructure. The authentication of the connection is effected via a public and non-protected communication channel and can also be effected at the application level.

LIST OF REFERENCE SIGNS

10 Communication System
12 First communication partner
14 Second communication partner
16 Connection
18 Computing unit
20 Communication module
22 Display device
24 Actuation device
26 Computing unit
28 Communication module
30 Display device
32 Actuation device
34 Vehicle
36-58 Method operations

The invention claimed is:

1. A method for providing connection authenticated at the application level between at least two communication partners comprising at least one vehicle infotainment system and at least one mobile terminal, the method comprising:

providing a shared secret key for the at least two communication partners;

establishing an anonymous signal-conducting connection between the at least two communication partners based on a transport layer security protocol, wherein all messages of the connection between the at least two communication partners are encrypted using the shared secret key; and performing authentication, under direction of a user, of the connection between the at least two communication partners, wherein authenticating, by a user, the connection between the at least two communication partners comprises:

calculating an integrity check value based on the shared secret key by a first communication partner of the at least two communication partners;

calculating an integrity check value based on the shared secret key by a second communication partner of the at least two communication partners;

reproducing, on a display unit of the first communication partner, the integrity check value calculated by the first communication partner based on the shared secret key;

reproducing, on a display unit of the second communication partner, the integrity check value calculated by the second communication partner based on the shared secret key; and enabling comparison, by the user, of the integrity check value reproduced on the display unit of the first communication partner with the integrity check value reproduced on the display unit of the second communication partner so as to enable confirmation, by the user, of the equality of the integrity check value reproduced by the first communication partner and the integrity check value reproduced by the second communication partner, wherein enabling confirmation comprises enabling user input confirmation via actuation of an actuation device of the first communication partner by the user; and enabling user input confirmation via actuation of an actuation device of the second communication partner by the user, wherein authenticating of the connection between the at least two communication partners is effected by the confirmation of the equality of the integrity check value reproduced by the first communication partner and the integrity check value reproduced by the second communication partner, and conducting encrypted communications via the authenticated connection between the at least two communication partners after authenticating of the connection.

2. The method of claim 1, wherein providing a shared secret key for the at least two communication partners comprises carrying out a key exchange protocol for generating the shared secret key.

3. The method of claim 2, wherein the key exchange protocol comprises a Diffie-Hellman key exchange protocol.

4. The method of claim 1, wherein the integrity check value calculated by the first communication partner and/or the second communication partner is a checksum over the shared secret key or a checksum over a value derived from the shared secret key.

5. The method of claim 1, wherein the actuation device of at least one of the at least two communication partners includes a voice activation device and user input confirmation includes spoken confirmation.

6. A communication system for encrypted communications via application-level authenticated connection, comprising:

at least two communication partners, wherein the at least two communication partners, comprising at least one vehicle infotainment system and at least one mobile terminal, establish an anonymous signal-conducting connection to one another based on a transport layer security protocol, wherein all messages of the connection between the at least two communication partners are encrypted using a shared secret key, wherein the at least two communication partners are configured for user authentication of the connection between the at least two communication partners, wherein the at least two communication partners, each calculate an integrity check value based on the shared secret key, and each reproduce the integrity check value for the user via a display device based on the shared secret key, and wherein each of the at least two communication partners provide a confirmation device comprising an actuation device for user input confirmation to confirm each of the equality of the integrity check values reproduced by the at least two communication partners, and wherein responsive to user input confirmation via the actuation device of each of the at least two communication partners, the connection is authenticated at the application level and the at least two communications partners are configured to conduct encrypted communications via the authenticated connection.

7. The communication system of claim 6, wherein the at least two communication partners implement a key exchange protocol for generating the shared secret key.

8. The communication system of claim 6, wherein the communication system performs a method for providing an authenticated connection between at least two communication partners, the method comprising:

providing the shared secret key for the at least two communication partners;

establishing an anonymous signal-conducting connection between the at least two communication partners based on the transport layer security protocol, wherein all messages of the connection between the at least two communication partners are encrypted using the shared secret key;

authenticating the connection between the at least two communication partners by the user;

wherein authenticating the connection between the at least two communication partners by the user comprises:

calculating the integrity check value based on the shared secret key by the first communication partner of the at least two communication partners;

calculating the integrity check value based on the shared secret key by the second communication partner of the at least two communication partners;

reproducing, by a display unit of the first communication partner, the integrity check value calculated by the first communication partner;

reproducing, by a display unit of the second communication partner, the integrity check value calculated by the second communication partner;

comparing, by the user, the integrity check value reproduced by the first communication partner with the integrity check value reproduced by the second communication partner; and presenting a confirmation device comprising an activation device for each of the first and second communication partners for user input confirmation to confirm the equality of the integrity check value reproduced by the first communication partner and the integrity check value reproduced by the second communication partner, wherein authenticating the connection between the at least two communication partners is effected by the user by the confirmation of the equality of the integrity check value reproduced by the first communication partner and the integrity check value reproduced by the second communication partner via user activation of the respective confirmation devices.

9. The communication system of claim 8, wherein a first communication partner of the at least two communication partners is a vehicle-internal device and/or a second communication partner of the at least two communication partners is a mobile terminal.

10. The communication system of claim 8, wherein providing a shared secret key for the at least two communication partners comprises carrying out a key exchange protocol for generating the shared secret key.

11. The communication system of claim 10, wherein the key exchange protocol comprises a Diffie-Hellman key exchange protocol.

12. The communication system of claim 8, wherein the integrity check value calculated by the first communication partner and/or the second communication partner is a checksum over the shared secret key or a checksum over a value derived from the shared secret key.

13. The communication system of claim 6, wherein the actuation device of at least one of the at least two communication partners includes a voice activation device and user input confirmation includes spoken confirmation.

* * * * *